United States Patent [19]
Gruett et al.

[11] Patent Number: 5,253,984
[45] Date of Patent: Oct. 19, 1993

[54] APPARATUS FOR DISPENSING A LIQUID ON A REMOTE OBJECT

[75] Inventors: Donald G. Gruett; Scott D. Wright, both of Manitowoc, Wis.

[73] Assignee: Oil-Rite Corporation, Manitowoc, Wis.

[21] Appl. No.: 918,633

[22] Filed: Jul. 21, 1992

[51] Int. Cl.$^5$ ............................ F04B 17/00; F05B 1/28
[52] U.S. Cl. .................... 417/401; 239/119; 239/120; 239/499; 184/15.2
[58] Field of Search ............... 239/119, 120, 499; 184/15.2, 15.3; 417/401

[56] References Cited

U.S. PATENT DOCUMENTS

| | | | |
|---|---|---|---|
| 2,601,893 | 7/1952 | Funke | 239/499 X |
| 3,236,455 | 2/1966 | Lewis et al. | 239/499 X |
| 4,784,578 | 11/1988 | Gruett | 417/225 |
| 4,784,584 | 11/1988 | Gruett | 417/399 |

FOREIGN PATENT DOCUMENTS 626158  7/1949  United Kingdom ............... 239/499

Primary Examiner—Richard A. Bertsch
Assistant Examiner—Roland McAndrews
Attorney, Agent, or Firm—Godfrey & Kahn

[57] ABSTRACT

An apparatus for efficiently applying a subject liquid on an object of interest is disclosed. The apparatus includes a metering device (30), a discharge tube (280) and a nozzle (290). The metering device (30) includes a cylinder (115) and a piston (165) which is operatively disposed within the cylinder to define a metering chamber (177) ahead of the piston. The metering device (30) includes a liquid inlet (108) and a liquid outlet (109). Fluid flow to the liquid outlet (109) is controlled by a check valve (130). The piston (165) is driven forwardly through a working stroke to force the liquid in the metering chamber (177), out of the metering chamber, and past the check valve (130). The piston (165) breaks the plane of the open end of the cylinder on each working stroke to preclude entrapment of air in the metering chamber (177), and thus provide for a more accurate metering. The nozzle (290) includes a fluid passageway (301) which is disposed in fluid flowing relation relative to the metering device (30). The passageway (301) is intersected by an elongated cavity (304) which is disposed in substantially perpendicular relation thereto. Formed on the nozzle (290) is an overflow reservoir (340) which is disposed in fluid communication with the passageway (301) and which collects any non-ejected subject liquid.

6 Claims, 8 Drawing Sheets

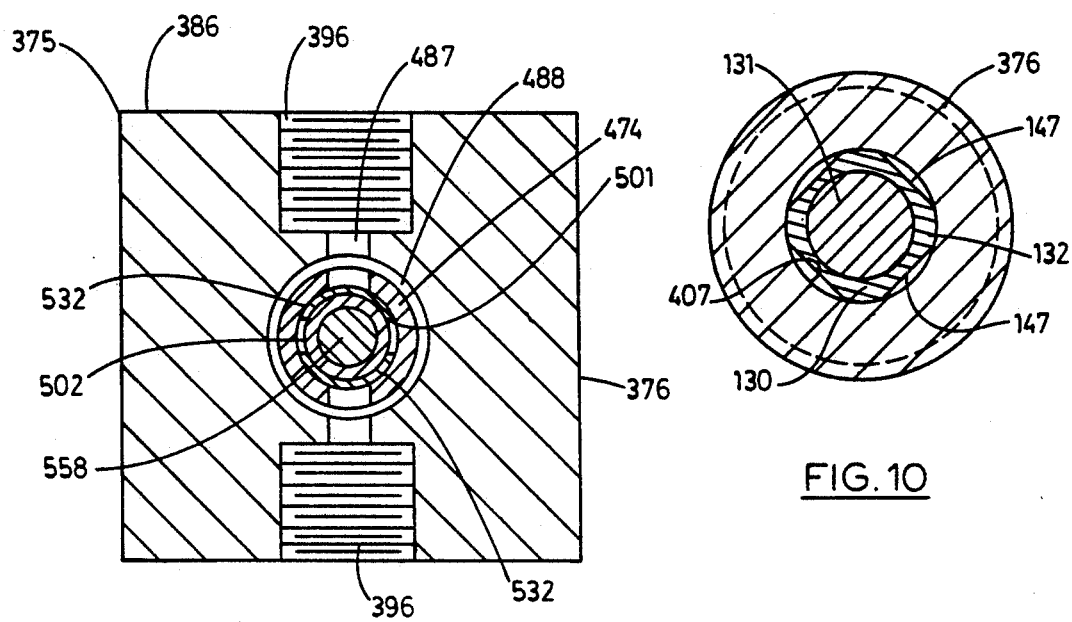
FIG. 9
FIG. 10
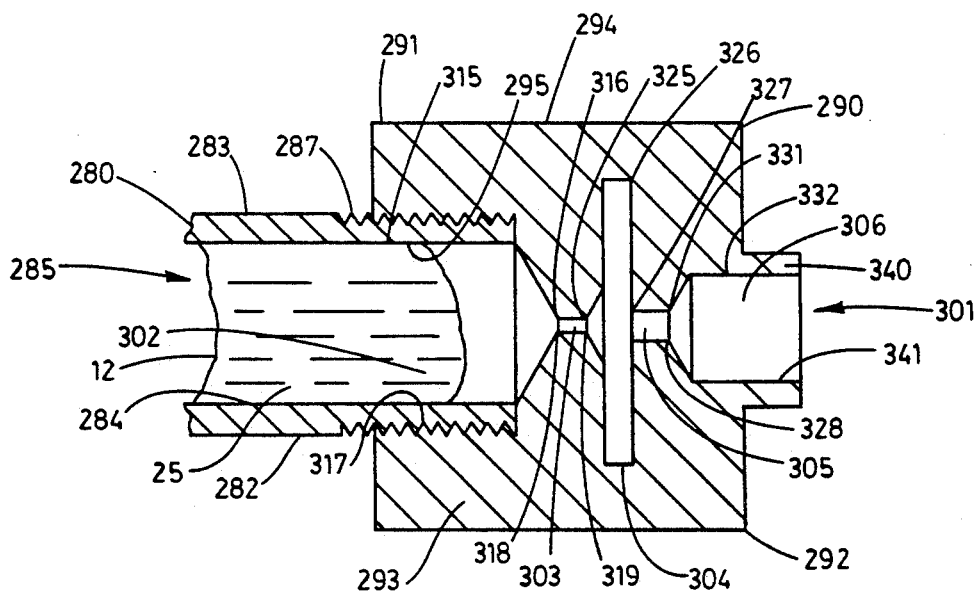
FIG. 11

APPARATUS FOR DISPENSING A LIQUID ON A REMOTE OBJECT

FIELD OF THE INVENTION

The present invention relates generally to an apparatus for dispensing and applying a liquid on an object of interest, and more particularly, to an apparatus which dispenses a metered volume of liquid, and which may be utilized to propel the metered volume of liquid toward a remote object of interest for application thereon. The apparatus of the present invention minimizes the production of any liquid spray component and inhibits the loss of liquid as by liquid drip or the like during the dispensing process, thereby reducing waste and preventing the contamination of the surrounding work environment.

BACKGROUND OF THE INVENTION

Oil lubricants are among the many fluids which are sometimes metered and dispensed during industrial operations. As used herein, "oil(s)," "oil lubricant(s)," and "lubricant(s)" are herein defined to broadly include petroleum-based and synthetically derived fluids which are in the liquid state when metered and dispensed. Accuracy in metering oil is important in that, if too little oil is supplied to a machine or machine parts, the machine may be placed at risk, as by damage caused by excessive friction. Conversely, if too much oil is supplied to a machine or machine parts, the excess oil may adulterate a product or may contribute to localized pollution or safety hazards in the vicinity of a work station. While accuracy in metering is generally desired, it is often difficult to attain. As a general matter, the prior art devices have not operated effectively because ambient air enters the feeding or metering system during lubrication operations and becomes entrapped in a metering chamber. In such prior art devices, the entrapped air in the metering chamber displaces liquid in the measured quantity to render metering in minute quantities virtually impossible, and in larger quantities inaccurate.

Industrial machines require lubrication throughout their operation cycles due to the conditions of the environment. For example, extremely high temperatures cause lubricants, which have been applied to power transmission assemblies, to evaporate or otherwise become displaced therefrom. Additionally, because of the configuration of certain manufacturing facilities or the type of manufacturing process, lubrication assemblies must sometimes be placed in a location remote to the object receiving the lubrication. On such occasions, it is often necessary to shoot or otherwise propel a measured volume of lubricant toward the object of interest requiring lubrication. Further, to meet the requirements and demands of industry to efficiently produce various commercial articles, it is often necessary to dispense and apply metered volumes of other fluids, such as adhesives. For example, hot melt adhesives are often applied to a carrier medium which is typically located a predetermined distance from the adhesive dispensing apparatus.

Heretofore, liquids, such as lubricants and the like, have been dispensed by means of conventional piston pumps which are disposed in fluid communication with a standard nozzle. More particularly, prior art liquid dispensing apparatuses typically employ conventional piston pumps to provide metered pulses of pressurized fluid which are directed through a standard single orifice type nozzle and toward an object of interest for application thereon. However, while widely diverse in construction and operation, prior art liquid dispensing apparatuses are replete with a multiplicity of deficiencies and shortcomings which have detracted from their usefulness.

Foremost among the deficiencies of the prior art liquid dispensing apparatuses is their apparent inability to deliver the entire metered volume of liquid on the object of interest. As should be understood, previously employed nozzles typically generate, in addition to a main stream of liquid, a secondary liquid stream component which is directed away from the object of interest, thereby reducing the volume of liquid received by the object of interest. This secondary liquid stream component is often referred to as "spray" or "tail-off." During a typical liquid dispensing process, the metered volume of liquid separates from the main stream of liquid at a location outside of the nozzle, which results in the production of the secondary liquid stream. Thereafter, gravity and ambient air turbulence work to scatter the spray or tail-off throughout the work environment. This, of course, contaminates the immediate work station, and wastes valuable resources, and often creates unsafe conditions within a manufacturing site.

Still another deficiency of the prior art lubricating devices is their apparent inability to reduce or eliminate drops of liquid which form on, and fall from, the end of the nozzle. When using a conventional piston pump, liquid typically collects at the discharge end of the nozzle following separation of the metered volume of liquid from the main stream of liquid. Over time, gravity acts upon this small collection of liquid drops and causes the drops to fall upon work floors and other work surfaces which are located below the nozzle. In view of this shortcoming, various drip avoidance methods have typically been employed, such as, for example, positioning drip pans immediately below the nozzle. Such drip pans are only marginally effective in reducing unsafe conditions in the workplace created by the dripping of liquids such as lubricants onto work floors and other work surfaces.

Accordingly, a need has arisen for an apparatus for dispensing and applying a liquid on a remote object of interest, wherein the liquid is dispensed in a metered volume which separates cleanly from the main stream of liquid and minimizes the production of a secondary liquid stream, and which substantially eliminates the drip of liquid from the apparatus during the dispensing and application process.

SUMMARY OF THE INVENTION

In accordance with the present invention, an apparatus applies a subject liquid on an object of interest and comprises a metering device disposed in fluid communication with the subject liquid and nozzle. The metering device includes a housing having an inlet and an outlet for the subject liquid, and a cylinder disposed in the housing including an end which communicates with the housing outlet. A check valve is borne by the housing and is biased to close the end of the cylinder, and a piston is operatively disposed in the cylinder defining therewith a metering chamber ahead of the piston. The inlet is disposed in fluid supplying relation relative to the metering chamber, and force applied to the piston drives the piston forwardly through a working stroke to force the liquid into the metering chamber, out of the chamber, and past the check valve. The nozzle is defined by a main body including opposite first and second ends, and is disposed in fluid-flowing relation relative to the metering device. The main body has formed therethrough a passageway having a predetermined cross-sectional dimension which permits fluid flow from the first end through the second end. An elongated cavity intersects the passageway. The elongated cavity has a cross-sectional dimension substantially greater than the passageway, and the second end of the main body has formed thereon an overflow reservoir which is disposed in fluid communication with the passageway and which collects any non-ejected liquid.

It is an object of the present invention to provide an improved apparatus for dispensing and applying a subject liquid on an object of interest.

Another object of the present invention is to provide such an apparatus which obtains the individual benefits to be derived from related prior art apparatuses and practices while avoiding the detriments individually associated therewith.

Another object of the present invention is to provide such an apparatus which substantially eliminates the formation of a secondary liquid stream, such as spray or tail-off, during the liquid dispensing and application process.

Another object of the present invention is to provide such an apparatus which is of relatively moderate cost to purchase and maintain, and which is inexpensive to operate.

Another object of the present invention is to provide such an apparatus which is characterized by ease of employment and simplicity of construction.

Another object of the present invention is to provide such an apparatus which substantially eliminates the drip of liquid from the discharge end of the nozzle during the liquid dispensing and application process.

Another object of the present invention is to provide a new and novel nozzle assembly which may be manufactured as original equipment for various lubrication assemblies, or alternatively, employed or utilized in the manner of retrofit.

Additional objects and advantages of the present invention are to provide improved elements and arrangements thereof in an apparatus for the purposes described which is dependable, economical, durable and fully effective in accompanying its intended purposes.

Further objects, features, and advantages of the invention will be apparent from the following detailed description taken in conjunction with the accompanying drawings.

BRIEF DESCRIPTION OF THE DRAWINGS

In the drawings:

FIG. 9 is a cross-sectional view taken along line 9—9 of FIG. 7.

FIG. 10 is a cross-sectional view taken along line 10—10 of FIG. 7.

FIG. 11 is a partial cross-sectional view of the nozzle of the present invention taken along line 11—11 of FIGS. 1 and 6.

DETAILED DESCRIPTION OF THE PREFERRED EMBODIMENT

First Embodiment

Figure 1:
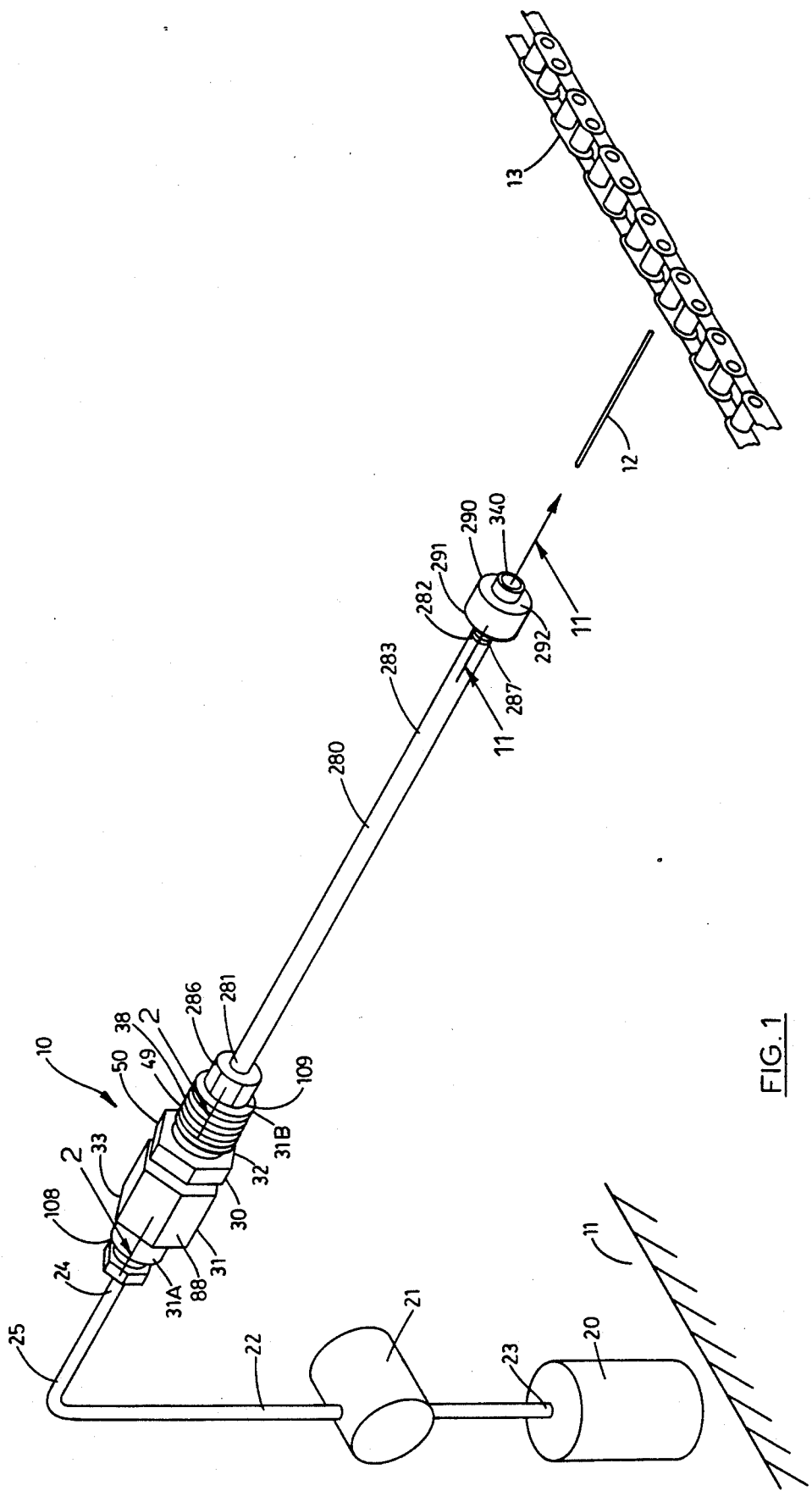
FIG. 1 is a perspective view of the first embodiment of the apparatus for dispensing a subject liquid of the present invention.

With reference to the drawings, a first embodiment of the apparatus for dispensing a liquid of the present invention is generally indicated at 10 in FIG. 1. As shown therein, the apparatus is mounted for operation on a suitable supporting surface 11. The apparatus is operable to dispense and apply a subject liquid 12, on an object of interest 13, such as a drive chain, for example. The apparatus minimizes the production of liquid spray during the dispensing and application process, and the apparatus further inhibits liquid drip from the apparatus during operation which thereby reduces waste, and prevents the contamination of a surrounding work station or a manufactured product.

The apparatus 10 is disposed downstream relative to a pump means 20 and a source of liquid 21, and the pump means 20 is disposed in liquid pumping relation relative to the liquid source 21. A liquid supply line 22 having a first end 23 and a second end 24 conducts a main stream of liquid 25 from the pump 20 to the apparatus 10, the source of liquid 21 typically being positioned intermediate the first and second ends 23 and 24. As should be understood, the pump 20 delivers the liquid 12 to the apparatus in pressure pulses for metered flow, as will be described in further detail hereinafter.

Figure 2:
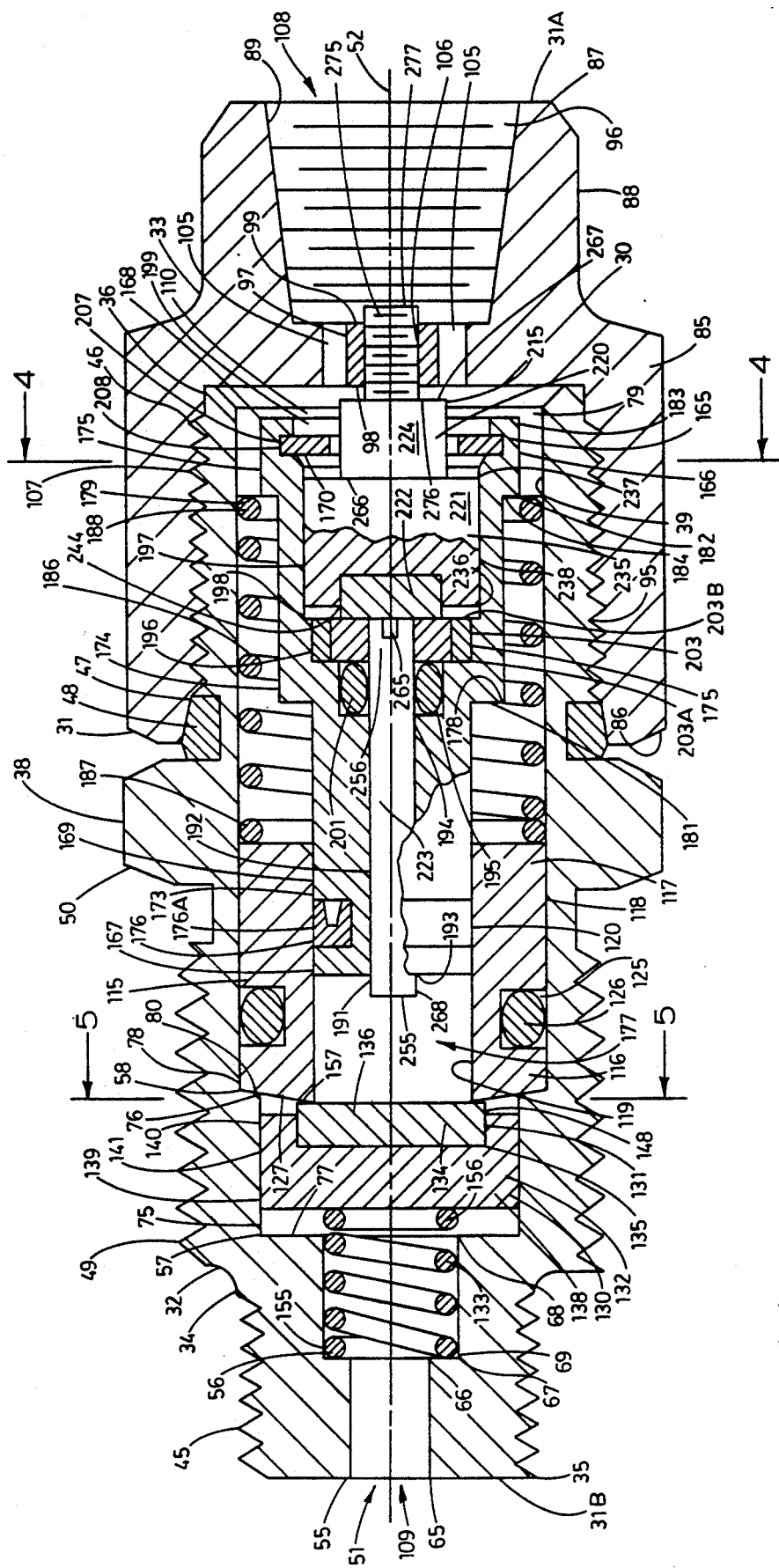
FIG. 2 is a cross-sectional view taken along line 2—2 of FIG. 1, the apparatus being shown prior to the initiation of a power or working stroke.
Figure 3:
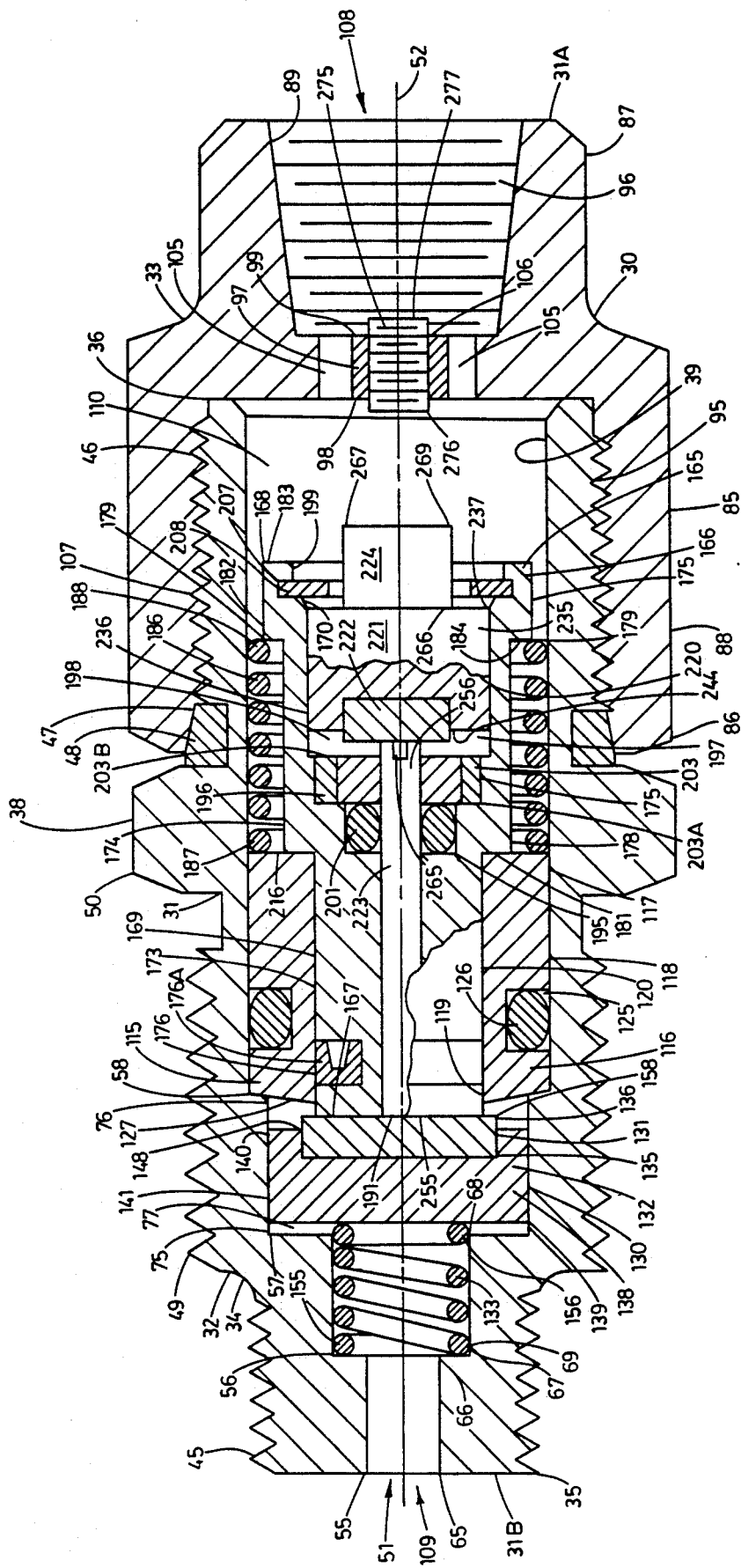
FIG. 3 is a cross-sectional view taken along line 2—2 of FIG. 1, the apparatus being shown at the end of a power or working stroke.

The apparatus 10 includes a hydraulically operated metering device 30, and a nozzle and a dispensing or discharge tube, the nozzle and the discharge tube being described in detail below. The metering device 30 is disposed in fluid receiving relation relative to the liquid source 21 as will be described in further detail hereinafter. FIG. 2 shows the internal arrangement of the apparatus prior to the initiation of a power or working stroke, and FIG. 3 shows the internal arrangement of the apparatus at the completion of the working stroke, the operation of the apparatus being explained in detail hereinafter. The metering device is enclosed by a housing 31 which has a first end 31A and a second end 31B which axially opposes the first end 31A. The housing 31 is formed by the screwthreadable mating of a male fitting 32 and a female fitting 33, as described in further detail hereinafter.

The male fitting 32 is defined by a main body 34 which includes a first end 35 and an axially opposed second end 36, and the male fitting is generally disposed at the second end 31B of the metering device 30. The main body 34 is defined by an exterior surface 38 and an interior surface 39. Formed in the exterior surface of the first end 35 are a plurality of screw threads 45 which are operable to screwthreadably engage a suitable fitting, such as the dispensing or discharge tube, for example. Additionally, formed in the exterior surface 38 of the second end 36, are a plurality of screw threads 46 which are operable to engage the female fitting 33. Formed in the exterior surface 38, in juxtaposed relation relative to the screw threads 46 of the second end 36, is a groove or channel 47 which locates a gasket or O-ring 48. Additionally, the exterior surface 38 may have formed therein a plurality of screw threads 49 which are operable to mount the metering device 30 to the supporting surface 11. Also, the exterior surface 38 may have formed thereon a hexagonally shaped nut 50, or similar surface, which may accommodate a suitable tool, such as a wrench. Moreover, the interior surface 39 defines a stepped, generally cylindrically shaped internal bore 51 which continuously extends from the first end 35 to the second end 36 of the main body 34, and which is oriented in substantial coaxial alignment to a longitudinal axis 52.

The internal bore 51 is defined by a plurality of coaxially aligned circumferential steps which are oriented longitudinally relative to the axis 52, and which are individually disposed in fluid communication, one to the other. Beginning from the first end 35 of the male fitting 32 and continuing toward the second end 36, the steps include a first step 55, a second step 56, a third step 57 and fourth step 58, in succession. The first step 55 is defined by a predetermined diametral dimension, and is bound by a first end 65 and a second end 66. Disposed adjacent to the second end 66 of the first step 55 is the second step 56 which is bound by a first end 67 and a second end 68, and wherein formed in the first end 67 is an annular shoulder 69. The second step 56 is defined by a diametral dimension which is greater than the diametral dimension of the first step 55. Disposed adjacent to the second end 68 of the second step 56 is the third step 57 which is bound by a first end 75 and a second end 76, and wherein formed in the first end 75 is an annular shoulder 77. The third step 57 is defined by a diametral dimension which is greater than the diametral dimension of the second step 56. The fourth step 58 is disposed adjacent to the second end 76 of the third step 57. The fourth step 58 is bound by a first end 78 and a second end 79, and wherein formed in the first end 78 is an annular shoulder 80. Further, the fourth step 58 is defined by a diametral dimension which is greater than the diametral dimension of the third step 57.

Figure 4:
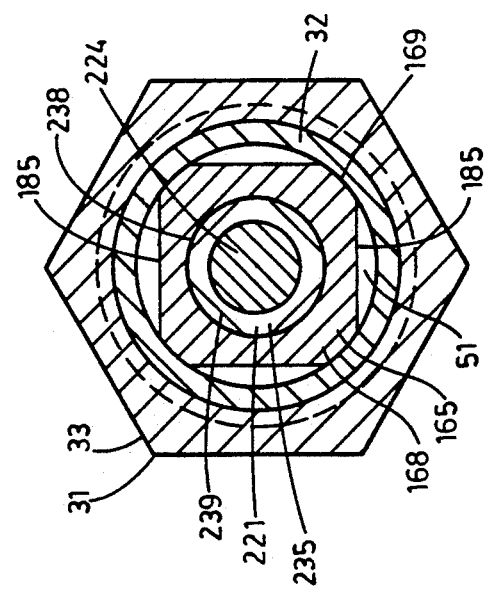
FIG. 4 is a cross-sectional view taken along line 4—4 of FIG. 2.

The female fitting 33 is defined by a main body 85 having a first end 86 and an axially opposed second end 87, and the female fitting is generally disposed at the first end 31A of the metering device 30. The main body further includes an exterior surface 88 and an interior surface 89. As best illustrated in FIG. 4, and in the preferred embodiment, the exterior surface 88 of the first end 86 includes a portion which is generally hexagonally shaped to accommodate a conventional wrench or other similar tool. However, the exterior surface of the second end 87 is generally cylindrically shaped. The interior surface 89 defines two discrete internal bores. The first bore 95 is generally disposed at the first end 86 of the main body 85 and has a predetermined diametral dimension. The second bore 96 is generally disposed at the second end 87 of the main body 85 and has a diametral dimension which is less than the diametral dimension of the first bore 95. The first and second bores are generally coaxially aligned, one to the other, and are additionally coaxially aligned relative to the longitudinal axis 52. The first and second bores are separated, one from the other, by an interior wall 97 having an interior facing surface 98 and an exterior facing surface 99. Formed generally normally through the interior wall 97 are a plurality of apertures or openings 105 which place the first bore 95 and the second bore 96 in fluid flowing communication, one to the other, the subject fluid flowing from the second bore 96 toward the first bore 95. The apertures or openings 105 are generally axially disposed in parallel off set relation relative to the longitudinal axis 52. Additionally, formed generally normally through the interior wall 97 is a threaded aperture 106 which is oriented coaxially to the longitudinal axis 52, and which has a predetermined diametral dimension which screwthreadably receives an adjusting set screw which is described in further detail hereinafter. Additionally, formed in the interior surface 89 of the first bore 95 are a plurality of screw threads 107 which matingly, and screwthreadably receive the screw threads 46 of the second end 36 of the male fitting 32. Accordingly, the metering device 30 may be selectively disassembled for maintenance or repair. As should be understood, a liquid inlet 108 is formed at the first end 31A of the housing 31, and the inlet is coaxially disposed in fluid flowing relation relative to the second bore 96. The second end 24 of the liquid supply line 22 is suitably, fluid flowingly connected on the first end 31A of the housing 31. A liquid outlet 109 is formed at the second end 31B of the housing 31, and the liquid outlet is coaxially disposed in fluid flowing relation relative to the first step 55 of the male fitting 32. When the male fitting 32 is screwthreadably received by the female fitting 33, an internal cavity or chamber 110 is formed by the stepped, internal bore 51 and the interior facing surface 98 of the interior wall 97.

As illustrated in FIGS. 2 and 3, the fourth step 58 of the internal bore 51 receives a conformably shaped cylindrical sleeve 115 having a first end 116; a second end 117 which axially opposes the first end 116; an exterior surface 118 which defines a predetermined outer sleeve diametral dimension; and an interior surface 119 which defines an internal region 120 having a predetermined inner sleeve diametral dimension. The outer sleeve diametral dimension is slightly less than the diametral dimension of the fourth step 58 of the male fitting 32 to provide necessary clearance, and thereby, to permit the sleeve 115 to be positioned within the fourth step 58 generally adjacent to the first end 78 in abutting relation relative to the annular shoulder 80. Formed in the exterior sleeve surface 118 between the first and second ends, 116 and 117, respectively, is a groove or channel 125 which receives and locates an O-ring or gasket 126. As viewed in FIGS. 2 and 3, the first end of the sleeve 115 is tapered to provide a peripheral edge 127 which projects forwardly, toward the outlet 109, and into the second end 76 of the third step 57.

Figure 5:
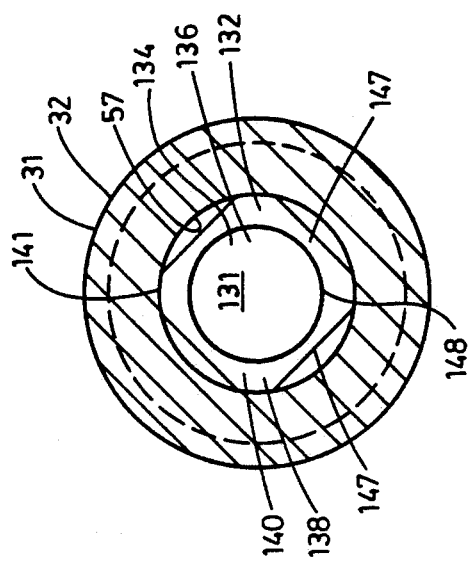
FIG. 5 is a cross-sectional view taken along line 5—5 of FIG. 2.

A check valve 130 is slidably disposed within the third step 57 of the male fitting 32. The check valve includes a sealing block 131, a carrier 132, and a coil spring 133 which are all disposed in coaxial alignment relative to the longitudinal axis 52. The carrier 132 is disposed intermediate the sealing block 131 and the coil spring 133. The sealing block 131 is defined by a generally cylindrically shaped resilient main body 134 having a predetermined diametral dimension and including a first end 135 and an axially opposed second end 136. The carrier 132 is defined by a generally cylindrical shaped main body 138 having a first end facing surface 139 and an axially opposed second end facing surface 140. Further, the carrier main body 138 includes an exterior surface 141 which defines a predetermined carrier main body diametral dimension which is slightly less than the diametral dimension of the third step 57. As seen in FIG. 5, a plurality of flat surfaces or flats 147 are formed in the exterior surface 141 of the carrier main body 138. By simultaneous reference to FIGS. 2 and 3, a generally cylindrically shaped recess 148 is formed in the second end facing surface 140 of the carrier 132, and which is suitably dimensioned to fixedly receive and mount the first end 135 of the sealing block 131. The coil spring 133 includes a first end 155 and an opposite second end 156. The coil spring 133 is housed within the second step 56, and when properly positioned therein, the first end 155 of the coil spring 133 abuts against the annular shoulder 69, and the second end 156 is biased against the first end facing surface 139 of the carrier main body 138. As should be understood, the check valve 130 is operable to slidably move along a path of travel, which is coaxially aligned with the longitudinal axis 52, within the third step 57, from a first, closed position 157, to a second, open position 158. As seen in FIG. 2, the coil spring 133 biases the check valve 130 along the path of travel toward the first, closed position 157 and against the peripheral edge 127 such that the second end 136 of the sealing block 131 closes the first end 116 of the sleeve 115 and the internal chamber 110. Further, the flats 147 permit the subject liquid 12 to flow around the carrier main body 138 when the check valve 130 is disposed in the open or second position, as will be described in further detail hereinafter.

FIGS. 2 and 3 illustrate a stepped, generally cylindrically shaped piston 165 which is operatively disposed within the internal chamber 110 in coaxial alignment relative to the longitudinal axis 52. The piston 165 is defined by a main body 166 which has a first end 167, an axially opposed second end 168, an exterior surface 169 and an interior surface 170. Beginning from the first end 167 and continuing forward toward the second end 168 of the piston 165, the exterior surface defines a first circumferential step 173 having a predetermined diametral dimension, a second circumferential step 174 having a predetermined diametral dimension which is greater than the diametral dimension of the first step 173, and a third circumferential step 175 having a diametral dimension which is greater than the diametral dimension of the second step 174. The first step 173 is slidably received by the internal region 120 of the sleeve 115, and when disposed therein, the first step 173 forms with the internal region 120 a metering chamber 177 which is defined by the first end 167 of the piston 165, the interior surface 119 of the sleeve 115, and the second end 136 of the sealing block 131. The second step 174 is bound by a first end 178 and a second end 179. Formed in the first end 178 is an annular shoulder 181. The third step 175 is bound by a first end 182 and a second end 183. Formed in the first end 182 is an annular shoulder 184. Additionally, and as best seen by reference to FIG. 4, formed on the exterior surface 169 of the third step 175 are a plurality of flat surfaces or flats 185 which are operable to equalize the effects of pressure upon the third step 175 created during piston operation.

A piston return coil spring 186 is operatively disposed within the fourth step 58 of the male fitting 32 in a location proximate to the second end 36 of the male fitting 32. When disposed therein, the piston return coil spring 186 is coaxially aligned relative to the longitudinal axis 52. As should be understood, the piston return coil spring 186 biasedly receives the stepped piston 165. The piston return coil spring 186 has a first end 187 and a second end 188, and the first end 187 abuts against the second end 117 of the sleeve 115, and the second end 188 of the piston return coil spring 186 is biased against the annular shoulder 184.

The interior surface 170 of the piston 165 defines a stepped bore 191 which is axially oriented within the piston main body 166 relative to the first and second ends, 167 and 168, respectively. The stepped bore 191 continuously extends from the first end 167 to the second end 168 of the piston 165. When the piston 165 is properly located within the internal chamber 110, the stepped bore 191 is coaxially aligned with the longitudinal axis 52. The stepped bore 191 is defined by a plurality of cavities which are coaxially aligned one to the other. A first cavity 192 includes a first end 193 and a second end 194, and has a predetermined diametral dimension. A second cavity 195 has a predetermined diametral dimension which is greater than the diametral dimension of the first cavity 192. A third cavity 196 has a diametral dimension which is greater than the diametral dimension of the second cavity 195. A fourth cavity 197 is bound by a first end 198 and a second end 199, and the fourth cavity 197 has a diametral dimension which is greater than the diametral dimension of the third cavity 196. The diametral dimension of the second end 199 of the fourth cavity 197 is slightly greater than the diametral dimension of the first end 198. The second cavity 195 receives and locates an annular friction lock and seal member 201. Formed in the interior surface 170 of the third cavity 196 are a plurality of screw threads (not shown), and the third cavity 196 screwthreadably receives and locates a threaded annular securement member 203 having a first end facing surface 203A and an axially opposed second end facing surface 203B. Further, formed in the interior surface 170 of the second end 199 of the fourth cavity 197 is a groove or channel 207 which receives and mounts a snap ring 208.

The stepped bore 191 slidably receives a valve assembly 220 which includes a generally cylindrically shaped valve member 221 having a diametral dimension which is slightly less than the diametral dimension of the fourth cavity 197, a cylindrically shaped resilient sealing block 222 having a diametral dimension less than the diametral dimension of the valve member, a hollow tube 223 and a stem or projection 224. When properly located within the stepped bore 191, the valve assembly 220 is coaxially aligned relative to the longitudinal axis 52. The valve member 221 is axially slidable within the fourth cavity 197 and is defined by a valve member main body 235 which includes a first end 236 and a second end 237 which axially opposes the first end 236. Further, and as best illustrated by FIG. 4, the valve member main body 235 is defined by an exterior surface 238 which has formed therein one or more flat surfaces or flats 239 which permit the passage of the subject liquid 12 around the valve member main body 235 as described hereinafter. Additionally, formed in the first end 236 of the valve member main body 235 is a generally cylindrically shaped recess 244 which is suitably dimensioned to receive the resilient sealing block 222.

The tube 223 includes a first end 255, an axially opposed second end 256, an exterior surface 257 which defines an outer tube diametral dimension, and an interior surface (not shown) which defines an inner tube channel or passageway (not shown). The outer tube diametral dimension is slightly less than the diametral dimension of the first cavity 192 of the stepped bore 191. Formed through the exterior surface 257 of the second end 256 of the tube 223 is an aperture or opening 265 which permits the subject liquid to fluid flowingly enter into the inner tube channel. As should be understood, the second end 256 of the tube 223 is mounted on or otherwise made integral with the resilient sealing block 222, and when mounted thereon, the tube extends generally normally outwardly relative thereto from the fourth cavity 197 of the stepped bore 191, through the annular securement member 203, the annular resilient friction lock and seal member 201, and into the first cavity 192. The stem or projection 224 includes a first end 266 and an axially opposed second end 267. The stem 224 is generally cylindrically shaped having a diametral dimension which is substantially less than the diametral dimension of the valve member main body 235. The first end of the stem 266 is mounted on the second end 237 of the valve member main body 235. The stem 224 extends generally normally outwardly relative to the second end 237 of the valve member main body 235 from the fourth cavity 197, through the snap ring 208, toward the threaded aperture 107.

As previously described, an adjusting set screw 275, having a first end 276 and an axially opposing second end 277, is screwthreadably received by the threaded aperture 107. The first end of the threaded set screw is screwthreadably extendable into the fourth cavity 197. The second end 277 of the adjusting set screw 275 may be accessed through the second bore 96 of the female fitting 33. During operation, the first end of the adjusting set screw is engagable with the second end 267 of the stem 224 when the piston is disposed in the first position 215. As should be understood, when the first end 276 of the adjusting set screw is fully retracted from the fourth cavity 197, a metering chamber 177 of maximum volume is achieved for maximum feeding or metering of the subject liquid with each working stroke of the piston. As the second end of the adjusting set screw is turned to screwthreadably drive the first end 276 into the fourth cavity 197, the metering chamber 177 will be correspondingly shortened and provide for corresponding feeding of the subject liquid with each piston stroke. However, and as appreciated by one skilled in the art, the amount of feeding by the metering device 30 is not only controlled by the size of the metering chamber 177, but also by the pulsing rate of the pump 20. As should be understood, the piston 165 reciprocates within the internal chamber 110 along a linear path of travel which is coaxially aligned with the longitudinal axis 52, from a first position, wherein the stem 224 abuts against either the first end 276 of the adjusting set screw 275 or the interior facing wall 98 (indicated generally at 215 in FIG. 2); to a second position, wherein the annular shoulder 181 of the piston 165 abuts against the second end 117 of the sleeve 115 (indicated generally at 216 in FIG. 3). Also, the valve assembly 220 is freely, axially slidable within the stepped bore 191, independent of the piston 165, along a linear path of travel which is coaxially aligned relative to the longitudinal axis 52. The valve assembly 220 travels from a first position, wherein the sealing block 222 abuts against the second end facing surface 203B of the threaded annular securement member, (indicated generally at 268 in FIG. 2), to a second position, wherein the first end 255 of the tube 223 is driven flush with the first end 167 of piston 165 (indicated generally at 269 in FIG. 3). When the valve assembly 220 is disposed in the second position 269, the second end 237 of the valve member main body 235 abuts against the snap ring 208.

The apparatus 10 includes a dispensing or discharge tube 280 having a first end 281, an axially opposed second end 282, an exterior surface 283, and an interior surface 284 which defines a channel or passageway 285. The passageway 285 has a predetermined diametral dimension and conducts fluid from the first end 281 to the second end 282. Mounted on, or otherwise made integral with, the first end 281 is a threaded mounting fixture 286 which is suitably dimensioned to screwthreadably engage the screw threads 45 of the male fitting 32 to thereby removably mount the dispensing tube on the metering device 30 in fluid flowing relation relative to the liquid outlet 109. Additionally, formed in the exterior surface 283 of the second end 282 are a plurality of screw threads 287 which are described in further detail hereinafter.

As best illustrated by reference to FIG. 11, the apparatus 10 includes a nozzle 290 which includes a first fluid receiving end 291 and an axially opposed second fluid ejection end 292. The nozzle 290 is defined by a main body 293 having an exterior surface 294, and an interior surface 295 which defines a fluid passageway 301. The passageway 301 continuously extends from the first fluid receiving end 291 to the second fluid ejection end 292. Beginning at the fluid receiving end 291, the passageway is defined by a plurality of fluid-communicating portions which are coaxially aligned, one to the other, namely, a first portion 302, a second portion 303, a third portion 304, a fourth portion 305, and a fifth portion 306. The first portion 302 is bound by a first end 315 and a second end 316. Formed in the interior surface 295 of the first end 315 are a plurality of screw threads 317 which are operable to screwthreadably engage the screw threads 287 of the discharge tube 280 to mount the nozzle thereto and position it in fluid communication therewith. The interior surface 295 of the first portion 302 of the nozzle 290 defines a non-uniform cross-sectional dimension. The cross sectional dimension of the first end 315 of the first portion 302 is equal to the diametral dimension of the passageway 285 of the discharge tube 280. However, the interior surface 295 of the second end 316 of the first portion 302 converges relative to the first end 315 to define a cross-sectional dimension which is substantially less than the cross-sectional dimension of the first end 315. The second portion 303 is bound by a first end 318 and a second end 319. The interior surface 295 of the second portion 303 defines a predetermined uniform cross-sectional dimension which is substantially less than the cross-sectional dimension of the first end 315 of the first portion. The third portion 304 is bound by a first end 325 and a second end 326. The interior surface 295 of the third portion defines a non-uniform cross-sectional dimension. More particularly, the interior surface 295 diverges outwardly at the first end 325 of the third portion 304 relative to the cross sectional dimension of the second portion 303, and thereafter, and at a predetermined location within the third portion 304, the interior surface 295 defines a circumferential cavity having a substantially uniform diametral dimension which is substantially greater than the diametral dimension of the passageway of the discharge tube 280. The interior surface 295 of the fourth portion 305 defines a uniform cross-sectional dimension which is greater than the cross-sectional dimension of the second portion 303, but which is substantially less than the cross-sectional dimension of the passageway of the discharge tube 280. The fifth portion 306, is bound by a first end 331 and a second end 332. The interior surface 295 of the fifth portion defines a non-uniform cross-sectional dimension which diverges outwardly at the first end 331 relative to the cross-sectional dimension of the fourth portion 305. At a predetermined location within the fifth portion 306, the interior surface 295 defines a substantially uniform cross-sectional dimension which is greater than the cross-sectional dimension of the second and fourth portions, but which is less than the cross-sectional dimension of the passageway 285 of the discharge tube 280. Moreover, formed on the second end 292 of the nozzle main body 293 is an overflow reservoir 340 which has an interior surface 341. The overflow reservoir is defined by a cross-sectional dimension which is at least equal to the substantially uniform cross-sectional dimension of the second end 332 of the fifth portion 306.

Second Embodiment

Figure 6:
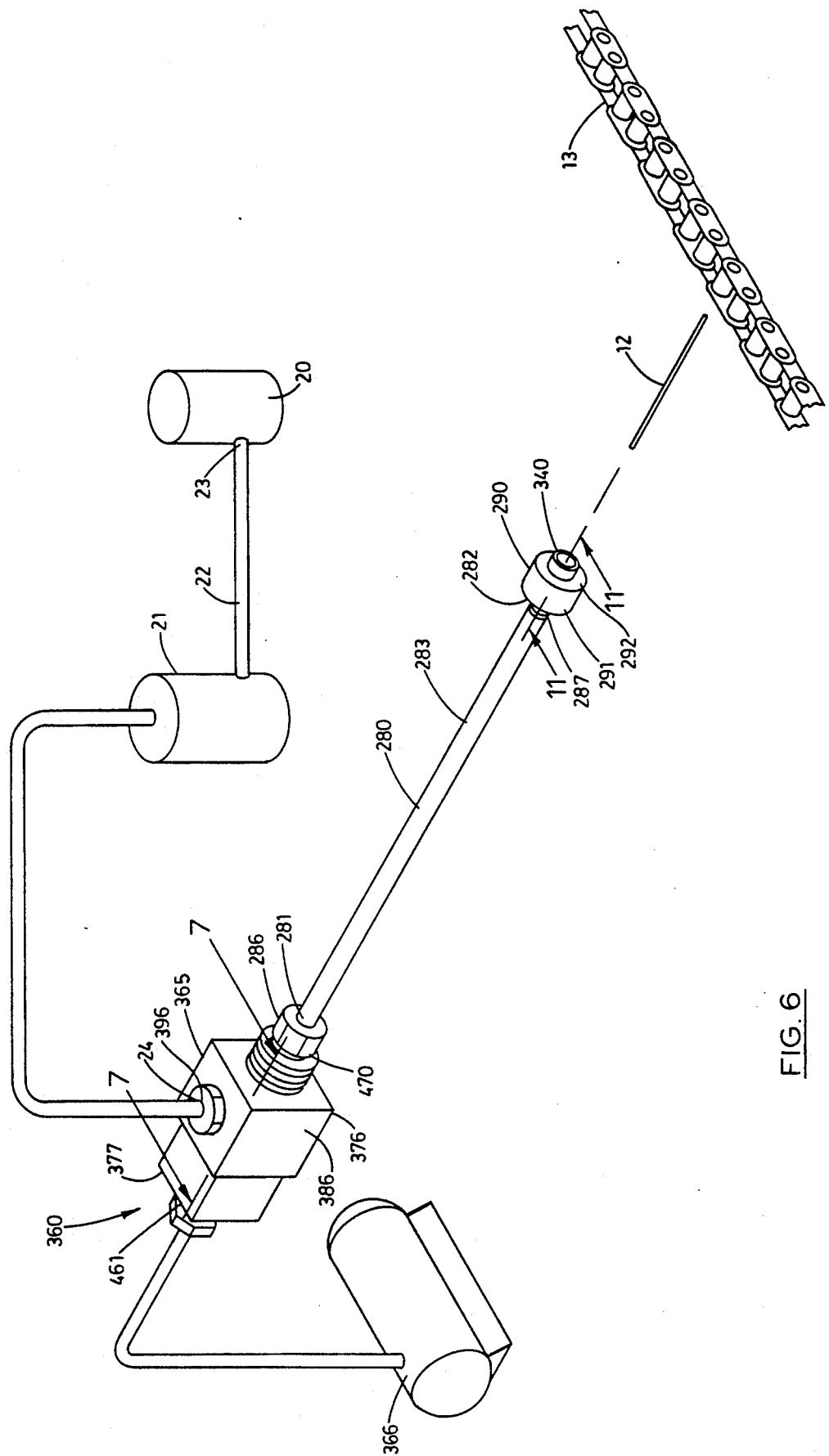
FIG. 6 is a perspective view of the second embodiment of the apparatus for dispensing a liquid of the present invention.
Figure 7:
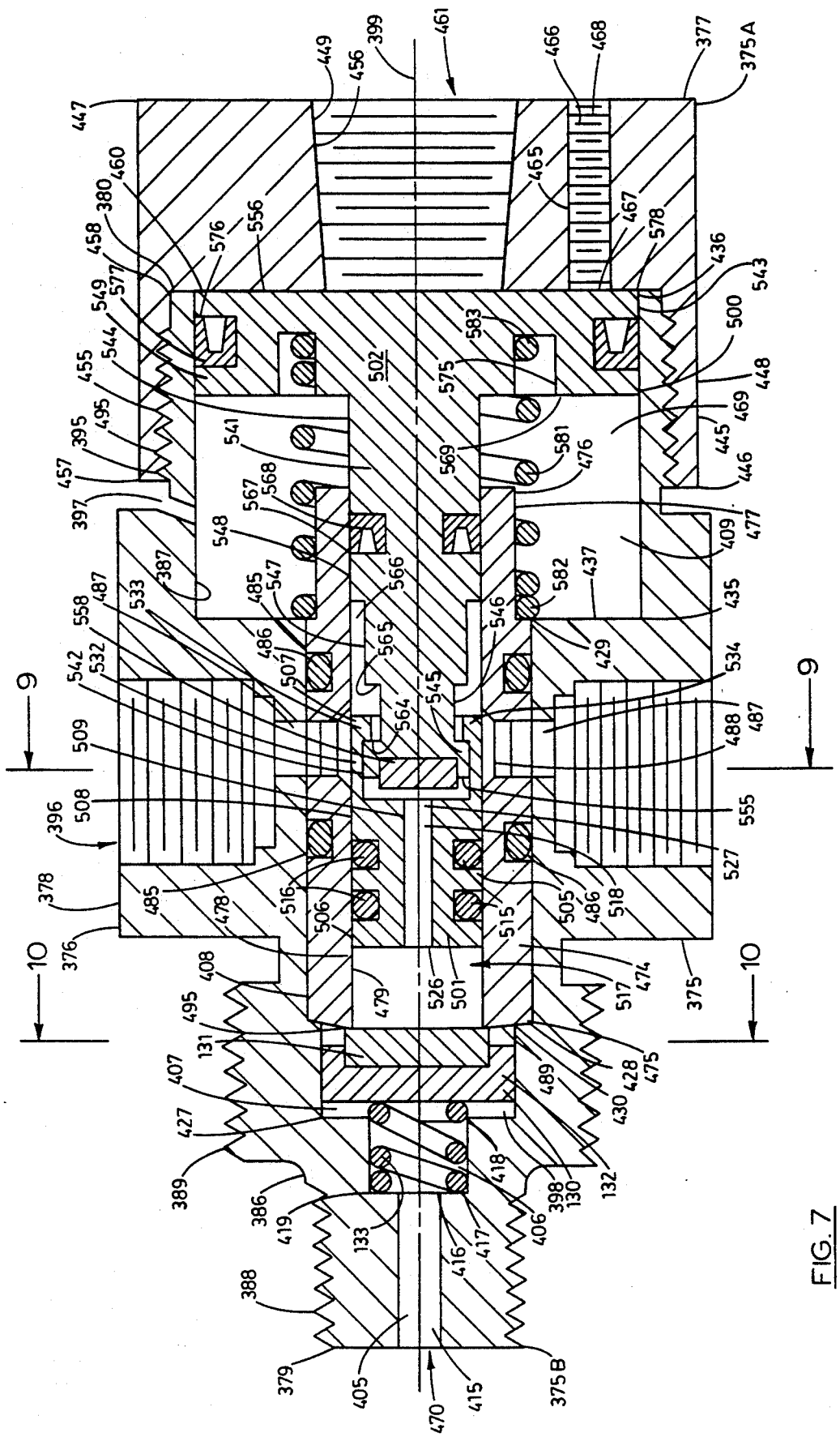
FIG. 7 is a cross-sectional view taken along line 7—7 of FIG. 6 being shown prior to the initiation of a power or working stroke.
Figure 8:
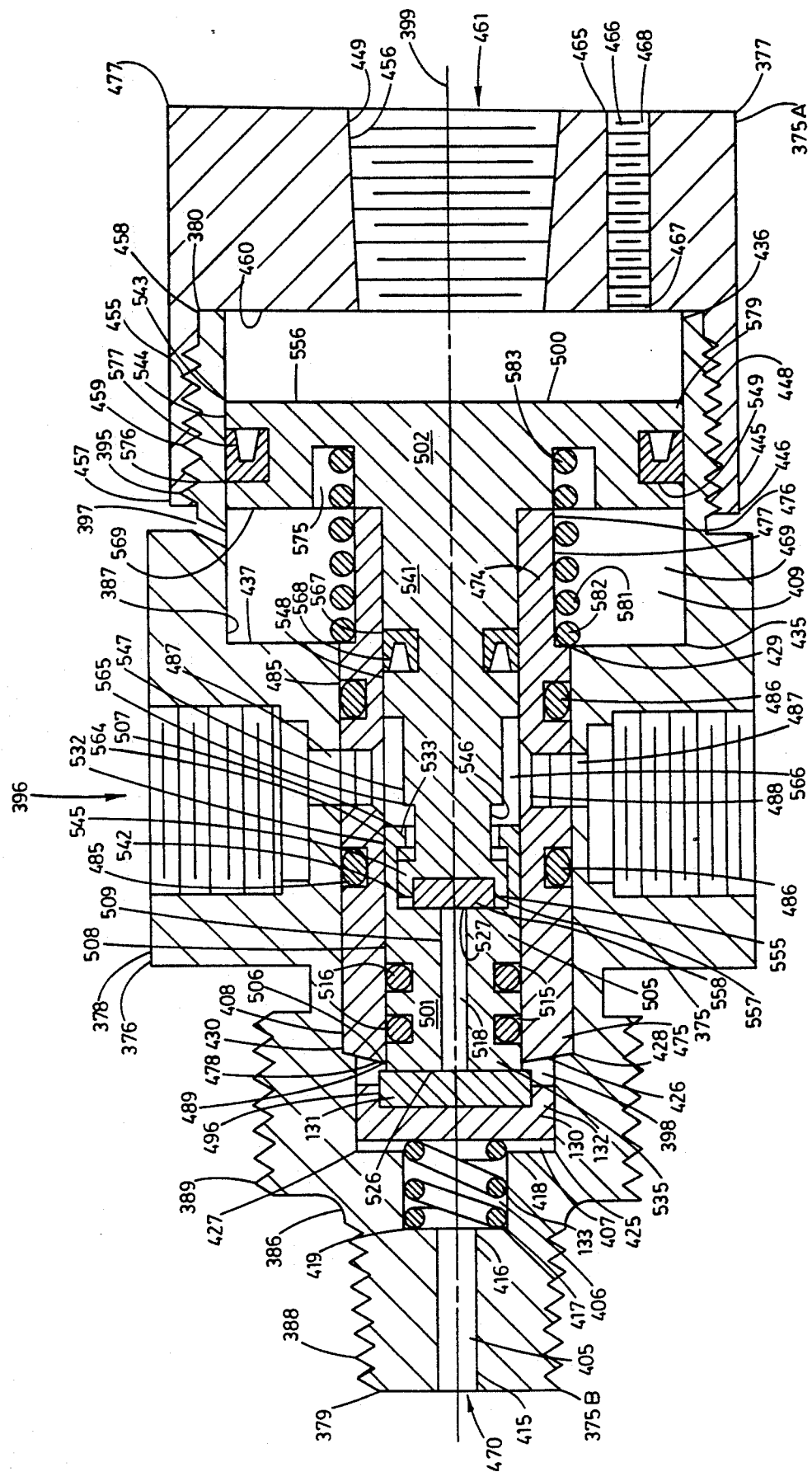
FIG. 8 is a cross-sectional view taken along line 7—7 of FIG. 6 being shown at the end of a power or working stroke.

A second embodiment of the subject invention is generally indicated at 360 in FIG. 6. As should be understood, the second embodiment of the present invention incorporates a pneumatically powered metering device 365, the discharge tube 280 and the nozzle 290. The metering device 365 is disposed in fluid receiving relation relative to a pneumatic power source 366. FIG. 7 shows the internal arrangement of the apparatus of the second embodiment prior to the initiation of a power or working stroke; and FIG. 8 shows the internal arrangement of the apparatus at the completion of the working stroke. The operation of the apparatus will be explained hereinafter. The second embodiment of the present invention incorporates various assemblies and subassemblies which have been described in the foregoing paragraphs with respect to the first embodiment of the apparatus 10, and therefore, for purposes of brevity, these assemblies and subassemblies are incorporated hereinafter by reference.

The metering device 365 is disposed downstream of the liquid pump 20 and in fluid receiving relation relative thereto. As previously described in the first embodiment, the pump 20 supplies the subject liquid 12 to the metering device 30 in pressurized pulses, however, and in the second embodiment, the pump 20 supplies the subject liquid to the pneumatic powered metering device 365 under constant pressure. Additionally, the pneumatic power source 366 supplies air to the metering device in pressurized pulses, which will be described in further detail hereinafter.

The metering device 365 is enclosed by a housing 375 which has a first end 375A, and a second end 375B which axially opposes the first end 375A. The housing 375 is formed by the screwthreadable mating of a male fitting 376 and a female fitting 377 as described in further detail hereinafter.

The male fitting 376 is defined by a main body 378 which includes a first end 379 and an axially opposed second end 380. The male fitting 376 is generally disposed at the second end 375B of the housing 375. The main body 378 is further defined by an exterior surface 386 and an interior surface 387. Formed in the exterior surface of the first end 379 are a plurality of screw threads 388 which are operable to screwthreadably engage the dispensing or discharge tube 280. Disposed in juxtaposed relation relative to the screw threads 388, and formed in the exterior surface 386, are a plurality of screw threads 389 which are operable to mount the metering device on the supporting surface 11. Additionally, and formed in the exterior surface 386 of the second end 380, are a plurality of screw threads 395 which are operable to screwthreadably engage the female fitting 377 as will be described in the paragraphs to follow. Moreover, formed in the exterior surface 386 at a location substantially midway between the screw threads 389 and 395, are a plurality of liquid inlet openings 396 which receive the second end 24 of the liquid medium supply line 22, and which are oriented substantially normally relative to the exterior surface 386. As should be understood, when a single metering device 365 is employed, the second end 24 of the liquid supply line 22 is connected to only one liquid inlet opening 396 and the other inlet opening is plugged or otherwise closed. A vent or opening 397 is formed in the exterior surface of the second end 380 of the male fitting 376, the vent being described in further detail hereinafter. The interior surface 387 defines a stepped, generally cylindrically shaped internal bore 398 which continuously extends from the first end 379 to the second end 380. The internal bore 398 is oriented in substantial coaxial alignment relative to longitudinal axis 399.

The internal bore 398 is defined by a plurality of coaxially aligned circumferential steps which are individually disposed in fluid communication, one to the other. Beginning from the first end 379, and continuing toward the second end 380, of the male fitting 376, the steps include a first step 405, a second step 406, a third step 407, a fourth step 408, and a fifth step 409. The first step 405 is defined by a predetermined diametral dimension and is bound by a first end 415 and a second end 416. Disposed adjacent to the second end 416 of the first step 405 is the second step 406, which is bound by a first end 417 and a second end 418. Formed in the first end 417 is an annular shoulder 419. The second step 406 is defined by a diametral dimension which is greater than the diametral dimension of the first step 405. Disposed adjacent to the second end 418 of the second step 406 is the third step 407, which is bound by a first end 425, and a second end 426. Formed in the first end 425 is an annular shoulder 427. The third step 407 is defined by a diametral dimension which is greater than the diametral dimension of the second step 406. The fourth step 408 is disposed in juxtaposed relation relative to the second end 426 of the third step 407, and is bound by a first end 428 and a second end 429. Formed in the first end 428 is an annular shoulder 430. The fourth step is defined by a diametral dimension which is greater than the diametral dimension of the third step 407. The fifth step 409 is disposed in juxtaposed relation relative to the second end 429, and is bound by a first end 435 and a second end 436. Formed in the first end 435 is an annular shoulder 437. The fifth step 409 is defined by a cross-sectional dimension which is substantially larger than the cross-sectional dimension of the fourth step 408.

The female fitting 377 is defined by a main body 445 having a first end 446 and a second end 447. The female fitting is generally disposed at the first end 375A of the metering device 365. The main body further includes an exterior surface 448 and an interior surface 449. The interior surface 449 defines first and second coaxially aligned internal bores, 455 and 456, respectively. The first bore 455 is generally disposed at the first end 446 of the female fitting 377, and is defined by a predetermined diametral dimension. The first bore 445 is bound by a first end 457 and a second end 458. A plurality of screw threads 459 are formed in the interior surface 449 of the first end 446 of the first bore 455, and which are suitably dimensioned to screwthreadably receive the screw threads 395 of the second end 380 of the male fitting 376. The second end 458 defines an interior wall 460. The second bore 456, which is generally disposed at the second end 447 of the female fitting 377, is defined by a predetermined diametral dimension. The second bore 456 is disposed in fluid flowing relation relative to an air inlet 461 through which compressed air is supplied to the metering device 365 from the pneumatic power source 366. Formed through the second end 447 of the female fitting, and through the interior wall 460, and oriented generally normally therewith, is a threaded aperture 465. The threaded aperture 465 is operable to accommodate an adjusting set screw 466 which has a first end 467, and a second end 468. When the male and female fittings are screwthreadably joined together, the first end of the adjusting set screw is screwthreadably extendable into the fifth step 409 of the male fitting 376. The adjusting set screw 466 is adjusted by way of the second end 468, such as by employing a screwdriver or the like. Further, and when the male and female fittings are screwthreadably assembled, an internal cavity or chamber 469 is formed by the stepped, internal bore 398 and the interior wall 460. A liquid outlet 470 is formed at the second end 375B of the housing 375, and the liquid outlet is coaxially disposed in fluid flowing relation relative to the first step 405 of the male fitting 376.

As illustrated in FIGS. 7 and 8, the fourth step 408 of the male fitting 376 receives a conformably shaped cylindrical sleeve 474 having a first end 475, a second end 476 which opposes the first end 475, an exterior surface 477 which defines a predetermined outer sleeve diametral dimension, and an interior surface 478 which defines an internal region 479 having a predetermined inner sleeve diametral dimension. The outer sleeve diametral dimension is slightly less than the diametral dimension of the fourth step 408 to provide the necessary clearance to permit the sleeve to be positioned within the fourth step, and in a location generally adjacent to the first end 428. When appropriately positioned, the first sleeve end 475 abuts against the annular shoulder 430, and the second sleeve end 476 extends within the fifth step 409. The exterior surface 477 of the second sleeve end 476 defines a slightly reduced outer diametral dimension as compared with the outer diametral dimension of the first end 475. Formed in the exterior sleeve surface 477, between the first and second ends 475 and 476, respectively, are a pair of grooves or channels 485 which receive and locate individual O-rings or gaskets 486. Disposed intermediate the grooves 485 is a passageway or aperture 487 which is disposed generally normally relative to the internal sleeve region 479, and which communicates in fluid flowing relation with the liquid inlet openings 396 thereby permitting the subject liquid to enter the internal region 479 of the sleeve 474. Further, an annular groove 488 is formed in the exterior sleeve surface and is disposed in radial alignment with the passageway or aperture 487. The first end 475 of the sleeve 474 is tapered, as viewed in FIGS. 7 and 8, to provide a peripheral edge 489 which projects forwardly toward the liquid outlet 470, and into the second end 426 of the third step 407.

The check valve 130, which has been described in detail in the first form of the apparatus 10, is slidably disposed within the third step 407. The check valve includes the sealing block 131, the carrier 132, and the coil spring 133. The check valve 130 slidably moves along a linear path of travel, which is coaxially aligned relative to the longitudinal axis 399, from a first, closed position 495, to a second, open position 496. As is apparent by reference to FIG. 7, the coil spring 133 biases the check valve 130 toward the first, closed position and against the peripheral edge 489. The flats 147, which are disposed on the exterior carrier surface 141, permit the subject liquid 12 to flow from the internal region 479 of the sleeve 474 toward the liquid outlet 470 when the check valve is disposed in the open, second position 496.

Slidably disposed within the internal chamber 469 is a dual piston assembly 500 which is coaxially aligned relative to the longitudinal axis 399, and which is actuated by the pulses of air pressure from the pneumatic power source 366. The dual piston assembly includes a metering piston 501, and an actuating piston 502, which are coaxially arranged one to the other. As should be understood, the actuating piston is mechanically linked with the metering piston which permits the metering piston and the actuating piston to reciprocate intermittently independently, one to the other, as will be described in further detail hereinafter.

The metering piston 501 includes a main body 505 having a first end 506, a second end 507 which axially opposes the first end 506, an exterior surface 508, and an interior surface 509. The exterior surface 508 defines an outer diametral dimension which is slightly less than the diametral dimension of the internal sleeve region 479 such that the metering piston is slidable therein. Further, and formed in the exterior surface 508 of the metering piston main body 505 are a plurality of channels 515 or grooves 515 which are operable to individually receive O-rings or gaskets 516. The metering piston forms with the interior surface 478 of the cylindrical sleeve 474 a metering chamber 517 which is defined by the sealing block 131, the interior surface 478 of the cylindrical sleeve 474, and the first end 506 of the metering piston 501. The interior surface 509 of the metering piston defines an interior bore 518. The bore 518 has a predetermined diametral dimension and is bound by a first end 526 and a second end 527. Formed on the second end 507 of the metering piston main body 505 are pair of diametrically opposed projections 532 which define an outer diametral dimension which is equal to the outer diametral dimension of the metering piston main body 505, and which terminate with transversely aligned and inwardly directed radial flanges 533. The diametrically opposed projections 532, and radial flanges 533, form a link which engages the actuating piston 502 as will be described in further detail hereinafter.

The actuating piston 502 includes a generally cylindrically shaped and stepped main body 541. The main body has a first end 542, a second end 543, and an exterior surface 544. The exterior surface 544 forms a plurality of coaxially aligned circumferential steps, namely, a first step 545, a second step 546, a third step 547, a fourth step 548, and a fifth step 549. The main body 541 is further defined by a forward facing surface 555 and a rear facing surface 556. The first step 545 is defined by a predetermined diametral dimension which is conformably dimensioned to slidably engage the mechanical link of the metering piston 501 by means of the radial flanges 533. Formed in the forward facing surface 555 of the first step 545 is a recess 557 which is operable to fixedly mount a cylindrical sealing block 558. The cylindrical sealing block is selectively engagable with the second end 527 of the bore 518 to selectively close the bore. The second step of the actuating piston has a predetermined diametral dimension which is less than the diametral dimension of the first step 545, and the second step 546 is bound by a pair of annular shoulders 564 and 565, respectively. As should be understood by a study of FIGS. 7 and 8, the second step 546 of the actuating piston is operable to accommodate the movement of the actuating piston relative to the metering piston. The third step 547 is defined by a diametral dimension which is greater than the diametral dimension of the second step 546, but which is less than the inner diametral dimension of the sleeve 474. Accordingly, a piston chamber 566 is defined by the exterior surface 508 of the third step 547 and the interior surface 478 of the sleeve 474. The fourth step 548 of the actuating piston is defined by a diametral dimension which is slightly less than the inner diametral dimension of the sleeve 474 which permits the actuating piston to be slidably received by the sleeve. Formed in the exterior surface of the fourth step 548 is a groove or channel 567 which is operable to receive and mount a piston ring 568. The fifth step 549 is defined by a diametral dimension which is slightly less than the diametral dimension of the fifth step 409 of the male fitting 376. Further, the fifth step 549 defines a forwardly facing annular shoulder 569 which has formed therein a groove 575. Further, formed in the exterior surface 544 of the fifth step 549 is a groove or channel 576 which is operable to receive and mount a piston ring 577. As should be understood, the metering piston 501 reciprocates within the cylindrical sleeve 474, along a linear path of travel which is coaxially aligned with the longitudinal axis 399. The metering piston 501 travels from a first position, wherein the annular shoulder 564 of the actuating piston 502 abuts against the pair of diametrically opposed projections 532 (indicated generally at 534 in FIG. 7); to a second position, wherein the sealing block 558 abuts against the second end 527 of the bore 518 (indicated generally at 535 in FIG. 8). As should be appreciated, the actuating piston 502 reciprocates within the internal chamber 469 along a path of travel which is coaxially aligned with the longitudinal axis 399. The actuating piston 502 travels from a first position, wherein the first end 542 abuts against the first end 467 of the adjusting set screw 468, or the interior wall 460 in those instances when the adjusting set screw 466 is fully retracted from the fifth step 409 of the male fitting 376 (indicated generally at 578 in FIG. 7); to a second position wherein the first end 506 of the metering piston 501 abuts against the sealing block 131 of the check valve 130 (indicated generally at 579 FIG. 8).

A piston return coil spring 581, having a first end 582 and a second end 583, is disposed within the fifth step 409 of the male fitting 376 in coaxial alignment relative to the longitudinal axis 399. The first end of the return coil spring is slidably received by the second end 476 of the sleeve 474 and is engagable with the annular shoulder 437. The second end 583 of the piston return coil spring is received by the groove 576. The return coil spring 581 biases the actuating piston 502 toward the interior wall 460 and into the first position 578.

The second embodiment of the present invention includes the discharge tube 280 which has been described in detail hereinabove, and which screwthreadably mates with the screw threads 388 of the male fitting 376. Further, the second embodiment of the present invention includes the nozzle 290 which is screwthreadably received by the second end 282 of the discharge tube 280.

OPERATION

The operation of the described embodiments of the present invention are believed to be readily apparent and is briefly summarized at this point.

FIRST EMBODIMENT

The apparatus 10 of the first embodiment of the subject invention is operable to dispense a metered volume of the subject liquid 12 on an object of interest 13. The apparatus includes a metering device 30 which is operable to precisely measure a minute volume of the subject liquid. The metering device includes a housing 31 having a liquid inlet 108 and a liquid outlet 109 through which the subject liquid flows. The housing 31 defines an internal chamber 110 which is disposed in fluid flowing relation relative to the inlet 108 and the outlet 109, respectively. A cylindrical sleeve 115 and check valve 130 are disposed within the chamber 110. The check valve is operable for travel from the first, closed position 157, wherein the coil spring 133 biases the sealing block 135 against the peripheral edge 127 of the cylindrical sleeve 115, to the second, open position 158, wherein the subject liquid 12 is permitted to flow through the outlet 109. A piston 165 is slidably received by the cylindrical sleeve 115. A metering chamber 177 is defined ahead of the piston 165. During a working stroke, the piston 165 reciprocates within the chamber 110 from the first position 215, to the second position 216. A dispensing or discharge tube 280 having a mounting fixture 286 is screwthreadably mounted on the first end 35 of the male fitting 32 in fluid flowing relation relative to the outlet 109. A nozzle 290 is screwthreadably mounted on the second discharge end 282 of the discharge tube 280.

During operation of the apparatus 10, the individual pressure pulses from the pump 20 are operable to supply the main stream 25 of the subject liquid 12 to the liquid inlet 108. These pressure pulses further initiate the power or working stroke of the piston 165. At the beginning of the working stroke, the check valve 130, the piston 165, and the valve assembly 220, are all disposed in their first positions, 157, 215, and 268, respectively. When the valve assembly is disposed in its first position, the first end 255 of the tube 223 extends substantially past the first end 167 of the piston 165. Initially, and during the working stroke, the piston 165, in combination with the valve assembly 220, move together as an integral unit toward the liquid outlet 109. When the pressure in the metering chamber 177 exceeds the biasing force of the coil spring 133, the check valve 130 opens to allow the liquid content of the metering chamber 177 to escape through the outlet 109. At the end of the working stroke of the piston 165, the first end 255 of the tube 223 engages the sealing block 131 of the check valve 130. After the forward progress of the valve assembly 220 has been arrested by the check valve 130, the piston 165 completes its working stroke by moving relative to the valve assembly 220, and substantially past the peripheral edge 127 of the cylindrical sleeve 115 to completely purge the metering chamber 177 of the liquid content. This particular facet of the invention precludes entrapment of air in the metering chamber thereby providing for more accurate metering of the liquid. At the end of the working stroke of the piston 165, the first end 167 of the piston 165, and the first end 255 of the tube 223 of the valve assembly 220 will generally be in coplanar alignment, one to the other, as generally shown in FIG. 3. At the completion of the power stroke, the check valve 130, piston 165, and valve assembly 220 are all disposed in their second positions 158, 216 and 269, respectively. At this point in the time during the power stroke, the opening 265 of the valve assembly tube 223 is exposed to the subject liquid which has filled the fourth cavity 197 of the piston 165. As should be understood, while the opening 265 is exposed to the subject liquid, passage of the liquid through the metering device is blocked by engagement of the check valve 130 on the first end 255 of the valve assembly tube 223.

At the termination of each of the pressure pulses, the check valve 130 is biased toward the first, closed position 157 by operation of the spring 133. The piston 165, together with the valve assembly 220, commence their movement toward the first piston position 215 by the action of the piston return coil spring 186. Initially, as the piston 165 moves rearwardly during the return stroke, the valve assembly 220 will remain in its second position 269 by the action of the friction seal member 201, and the piston 165 and the valve assembly 220 travel as an integral unit. At this point in time, the valve assembly is able to serve as a conduit to conduct liquid from the fourth cavity 197 to fill the metering chamber 177 during the return stroke. Prior to the conclusion of the return stroke, the stem or projection 224 engages the interior wall 97 or adjusting set screw 275. Thereafter, the piston 165 continues rearwardly relative to the valve assembly 220 until the sealing block 222 engages the second end 203B of the threaded annular securement member 203, closing the opening 265 and completing the power stroke.

As the liquid medium 12 is pumped out of the metering chamber 177 by the action of the piston 165, the main stream 25 of liquid medium 12 surges through the discharge tube 280 toward the first inlet end of the nozzle 291, and exits the second discharge end of the nozzle. Cessation of the individual pressure pulses, in combination with the configuration of the interior fluid passageway 301 of the nozzle, cause the metered volume of liquid to separate from the main stream 25 substantially within the main body of the nozzle. This substantially eliminates the formation of a secondary liquid stream component such as the spray or tail-off which was described earlier. The reservoir 340 is operable to collect any liquid which has separated from the main stream 25, but which has not been discharged by action of the apparatus 10. Further, the metering device 30, during the return stroke, is operable to draw back, or suck in, the non-discharged liquid from the reservoir 340 and into the discharge tube 280, whereby the non-discharged volume of liquid is made integral with the main stream 25. Therefore, the apparatus 10 is operable to significantly eliminate or reduce dripping of the liquid medium from the nozzle 290 upon work floors and other work surfaces which are located below the nozzle. Further, and because the non-ejected liquid medium is made integral with the main stream 25 during the return stroke, turbulence or distortion which would normally have been produced during the next working stroke, by action of the main stream 25 contacting a volume of liquid fluid within the nozzle 290 during discharge, is virtually eliminated.

SECOND EMBODIMENT

The second embodiment of the present invention accommodates the pneumatically powered metering device 365. The metering device 365 includes a housing 375 which includes the liquid inlet 396, the liquid outlet 470, the air inlet 461, and the vent 397. Received within the fourth step 408, of the male fitting 376, is the cylindrical sleeve 474 which communicates with the liquid outlet 470. The check valve 130 is reciprocally disposed within the third step 407 and is biased toward the second, closed position 158 to close the first end 475 of the sleeve 474. The dual piston assembly 500, which is slidably borne by the housing 375, includes the metering piston 501 and the actuating piston 502. A metering chamber 517 is defined by the first end 506 of the metering piston 501, the interior surface 478 of the sleeve 474, and the sealing block 558. As should be understood, the first end 542 of the actuating piston main body 541 is connected with the second end 507 of the metering piston 501 by means of the flanges 533. This permits the metering piston and the actuating piston to move independently, one to the other.

During operation of the metering device 365, the subject liquid 12 is continuously supplied to the metering device through the liquid inlet openings 396 which fills the metering chamber 517 and the piston chamber 566. When the metering chamber is filled, a pulse of air pressure through the air inlet 461 will drive the dual piston assembly 500 in a forward direction. Initially, the actuating piston 502, the metering piston 501 and the check valve 130 are all disposed in their first positions, 578, 534 and 157, respectively. Following actuation, the actuating piston will move relative to the metering piston until the sealing block 558 engages the annular shoulder 531 thereby closing the bore 518. Thereafter, both pistons continue forwardly toward the liquid outlet 470 as a unit. When the pressure in the metering chamber exceeds the biasing force of the check valve spring 133, the check valve will open thereby permitting passage of the liquid contents of the metering chamber 517 toward the liquid outlet 470. The power or working stroke of the two pistons, as a unit, continues until the forwardly facing annular shoulder 569 of the actuating piston 502 engages the second end 476 of the cylindrical sleeve 474. At this point in time, the actuating piston 502, the metering piston 501 and the check valve 130 are all disposed in their second positions, 579, 535 and 158, respectively. At this point in time, the metering piston 501 will be disposed in a location substantially past the peripheral edge 489 of the cylindrical sleeve 474 thereby purging all liquid and air from the metering chamber 517. When located in this position, the check valve is biased against the first end 506 of the metering piston 501 thereby closing the bore 518. Thereafter, the piston return coil spring 581 acts upon the actuating piston driving same back to the first position 578. Initially, on the return stroke, the actuating piston will move relative to the metering piston thereby opening the metering piston bore 518. Thereafter, the annular shoulder 564 of the actuating piston engages the flanges 533 of the metering piston and the metering piston and the actuating piston return as an integral unit to their respective first positions. During the return stroke, and while the metering piston bore 518 is open, the metering piston is refilled to begin the next working stroke. When the actuating piston returns to its first position 578, the rearwardly facing surface 556 engages the interior wall 460 or the adjusting set screw 466. As should be understood, the volume of the subject liquid may be selectively varied by the adjusting set screw 466. Additionally, the size of the piston chamber 566 may be selectively varied by imposing a corresponding constant pressure on the rearwardly facing surface of the actuating piston.

Therefore, the two embodiments of the liquid dispensing apparatus 10 are operable to dispense a metered volume of liquid, and which may be utilized during a manufacturing process to propel the metered volume of liquid toward a remotely located object of interest for application thereon. The two embodiments of the apparatus of the subject invention minimize any production of liquid spray or tail-off, and inhibit liquid drip during the dispensing process which thereby reduces waste and prevents the contamination of a surrounding work station.

It is understood that the invention is not confined to the particular construction and arrangement of parts herein illustrated and described, but embraces such modified forms thereof as come within the scope of the following claims.

What is claimed is:

1. An apparatus for applying a subject liquid on an object of interest, the apparatus comprising:
    a metering device disposed in fluid communication with the subject liquid, the metering device including a housing having an inlet and an outlet for the subject liquid and a cylinder being disposed in the housing, the housing including an end which communicates with the housing outlet and a check valve being borne by the housing and the check valve being biased to close the end of the cylinder, and a piston being operatively disposed in the cylinder thereby defining a metering chamber ahead of the piston and the inlet being disposed in fluid-supplying relation relative to the metering chamber, and wherein force applied to the piston drives the piston forwardly through a working stroke to force the subject liquid into the metering chamber, out of the chamber, and past the check valve; and
    a nozzle defined by a main body which includes opposite first and second ends and which is disposed in fluid-flowing relation relative to the metering device, the main body having formed therethrough a passageway which permits fluid flow from the first end through the second end, and an elongated cavity intersecting the passageway, and which is disposed in substantially perpendicular relation relative thereto, and the second end having formed thereon an overflow reservoir which is disposed in fluid communication with the passageway and which collects non-ejected subject liquid.

2. An apparatus, as claimed in claim 1, and wherein the metering device is pneumatically powered.

3. An apparatus for applying a subject liquid on an object of interest comprising:
    a metering device disposed in fluid communication with the subject liquid, the metering device including a housing having an inlet and an outlet for the subject liquid, and a cylinder being disposed in the housing, the housing including an end which communicates with the housing outlet and a check valve being borne by the housing and the check valve being biased to close the end of the cylinder, and a piston being operatively disposed in the cylinder thereby defining a metering chamber ahead of the piston and the inlet being disposed in fluid-supplying relation relative to the metering chamber, and wherein force applied to the piston drives the piston forwardly through a working stroke to force the subject liquid into the metering chamber, out of the chamber, and past the check valve; and
    a nozzle disposed in fluid-flowing relation relative to the metering device and the nozzle being defined by a main body including opposite first and second ends, the main body having formed therethrough a passageway which permits fluid flow from the first end through the second end, an elongated cavity intersecting the passageway, and the second end having formed therein an overflow reservoir which is disposed in fluid communication with the passageway and which collects non-ejected subject liquid, and wherein during operation, movement of the piston during the working stroke causes a metered stream of fluid to flow out of the second end of the nozzle assembly.

4. An apparatus, as claimed in claim 2, and wherein the metering device is pneumatically powered.

5. A nozzle for use in applying a subject liquid on an object of interest comprising a main body having a first end, a second end, a passageway formed therein which permits liquid flow from the first end to the second end, and a cavity which intersects the passageway, the second end having formed therein an overflow reservoir which is disposed in fluid communication with the passageway and which collects non-ejected liquid, and wherein during operation, a stream of liquid flows through the main body, and wherein the nozzle inhibits the formation of a secondary liquid stream component, and wherein, following ejection of the liquid, the nozzle sucks the non-ejected fluid which has collected in the overflow reservoir internally of the main body thereby substantially eliminating liquid dripping therefrom.

6. A nozzle for applying a subject liquid comprising a main body having a first end which receives the liquid, a second end through which liquid is ejected, and a passageway formed therein which extends from the first to the second end, and wherein the passageway has a first portion having a first end and a second end, the first portion having a predetermined cross-sectional dimension, and the passageway further including a second portion which is substantially coaxially aligned with the first portion and which has a substantially reduced cross-sectional dimension as compared to the first portion, and wherein the passageway further includes a third portion which is substantially coaxially aligned with the second portion and has a cross-sectional dimension which is greater than the first and second portions, and wherein the passageway further includes a fourth portion which is substantially coaxially aligned with the third portion and which further has a cross-sectional dimension which is greater than the second portion but which is less than first portion, and wherein the passageway further includes a fifth portion which is substantially coaxially aligned with the fourth portion and which has a cross-sectional dimension which is less than the first portion but which is greater than the fourth portion, and wherein the fifth portion defines an overflow reservoir.

* * * * *